United States Patent
Church et al.

(10) Patent No.: US 10,614,797 B2
(45) Date of Patent: Apr. 7, 2020

(54) PREFIX METHODS FOR DIARIZATION IN STREAMING MODE

(71) Applicant: International Business Machines Corporation, Armonk, NY (US)

(72) Inventors: Kenneth W. Church, Dobbs Ferry, NY (US); Dimitrios B. Dimitriadis, White Plains, NY (US); Petr Fousek, Litomerice (CZ); Jason W. Pelecanos, Ossining, NY (US); Weizhong Zhu, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 15/827,934

(22) Filed: Nov. 30, 2017

(65) Prior Publication Data
US 2018/0158451 A1    Jun. 7, 2018

Related U.S. Application Data

(60) Provisional application No. 62/428,956, filed on Dec. 1, 2016.

(51) Int. Cl.
*G10L 15/10* (2006.01)
*G10L 15/06* (2013.01)
(Continued)

(52) U.S. Cl.
CPC .............. *G10L 15/10* (2013.01); *G10L 15/04* (2013.01); *G10L 15/063* (2013.01);
(Continued)

(58) Field of Classification Search
None
See application file for complete search history.

(56) References Cited

U.S. PATENT DOCUMENTS 6,424,946 B1 * 7/2002 Tritschler ............. G06K 9/6226
704/272
7,657,431 B2 * 2/2010 Hayakawa .............. G10L 17/14
704/235
(Continued)

FOREIGN PATENT DOCUMENTS

RO          130883 A2     1/2016

OTHER PUBLICATIONS

Lange, T., Roth, V., Braun, M.L. and Buhmann, J.M., 2004. Stability-based validation of clustering solutions. Neural computation, 16 (6), pp. 1299-1323 (Year: 2004).*

(Continued)

*Primary Examiner* — Jonathan C Kim
(74) *Attorney, Agent, or Firm* — Patterson + Sheridan, LLP

(57) ABSTRACT

A diarization embodiment may include a system that clusters data up to a current point in time and consolidates it with the past decisions, and then returns the result that minimizes the difference with past decisions. The consolidation may be achieved by performing a permutation of the different possible labels and comparing the distance. For speaker diarization, a distance may be determined based on a minimum edit or hamming distance. The distance may alternatively be a measure other than the minimum edit or hamming distance. The clustering may have a finite time window over which the analysis is performed.

16 Claims, 8 Drawing Sheets

(51) Int. Cl.
  *G10L 15/08* (2006.01)
  *G10L 15/04* (2013.01)
  *G10L 17/06* (2013.01)

(52) U.S. Cl.
  CPC ............ *G10L 15/083* (2013.01); *G10L 17/06* (2013.01); *G10L 2015/0631* (2013.01)

(56) References Cited

U.S. PATENT DOCUMENTS

| | | | | |
|---|---|---|---|---|
| 8,554,563 | B2* | 10/2013 | Aronowitz | G10L 17/02 704/250 |
| 9,113,265 | B2 | 8/2015 | Aronowitz et al. | |
| 9,460,722 | B2 | 10/2016 | Sidi et al. | |
| 2004/0054533 | A1* | 3/2004 | Bellegarda | G10L 15/063 704/254 |
| 2012/0095764 | A1* | 4/2012 | Jeon | G10L 15/1822 704/246 |
| 2012/0253811 | A1* | 10/2012 | Breslin | G10L 15/26 704/249 |
| 2015/0302868 | A1 | 10/2015 | Sikveland et al. | |
| 2016/0071520 | A1* | 3/2016 | Hayakawa | G10L 17/04 704/247 |
| 2016/0283185 | A1 | 9/2016 | McLaren et al. | |

OTHER PUBLICATIONS

Cerva, P., et al., "Speaker-Adaptive Speech Recognition Using Speaker Diarization for Improved Transcription of Large Spoken Archives". Speech Communication, 55(10), 1033-1046, 2013.

Huijbregts, M.A.H. (2008). Segmentation, Diarization and Speech Transcription: Surprise Data Unraveled, 184 pp.

Disclosed anonymously, "Conversation-Based Browsing of Video, Audio, and Text Stories", IP.com No. IPCOM000191522D, Jan. 6, 2010.

* cited by examiner

| Type of SAD | Clustering Approach | Callhome Data % FA/Miss/Spk | Call Center Data % FA/Miss/Spk |
|---|---|---|---|
| ASR | Offline | 10.6/0.6/2.6 | 12.5/11.1/2.7 |
| ASR | L2R Prefix | 10.6/0.6/3.9 | 12.5/11.1/3.1 |
| ASR | L2R Greedy | 10.6/0.6/4.2 | 12.5/11.1/6.6 |

FIG. 2

| Hamming Dist | Prefix (Time →) |
|---|---|
| 0 | 11222211222212212 |
| 0 | 112222112222122121 |
| 0 | 1122221122221212121 |
| 1 | 11222211222212121212 |
| 0 | 212222112222121212122 |
| 0 | 2122221122221212121222 |
| 1 | 11222211222212121212221 |
| 1 | 212222112222121212122212 |
| 1 | 2122221122221212121222122 |
| 0 | 21222211222212121212221222 |

PREFIX METHODS FOR DIARIZATION IN STREAMING MODE

I. CROSS REFERENCE TO RELATED APPLICATIONS

This application claims priority from U.S. Provisional Patent Application No. 62/428,956, entitled "PREFIX METHODS FOR DIARIZATION IN STREAMING MODE," filed on Dec. 1, 2016, which is incorporated herein in its entirety.

II. FIELD OF THE DISCLOSURE

The present disclosure relates generally to audio processing, and in particular, to methods and systems to perform diarization.

III. BACKGROUND

Diarization systems can be distinguished into different groups based on how incoming audio is consumed. An offline system waits until the end of the audio stream before processing it and finding the homogeneous segments where different speakers are active. A second group of systems is based on processing the audio file as the audio comes in without any knowledge of future events. The latter approach is particularly challenging since the causality of the system does not allow it to provision for audio events, such as: on-hold music, prerecorded speech, synthesized speech, tones, and several speakers. Such limitations may limit the overall diarization performance.

A standard approach is to perform speaker detection and clustering in a causal way based on various distances and methods. This "greedy" approach tends to overestimate the number of speakers quickly fills the available slots by assigning them to irrelevant acoustic events (such as those described above). For example, the greedy approach struggles when a conversation starts with a computer voice whispering into an agent's ear a short summary of what happened in an Interactive Voice Response (IVR) system before a call is transferred to the agent. Errors are carried forward through an identification process and are compounded in instances with multiple callers.

IV. SUMMARY OF THE DISCLOSURE

According to a particular embodiment, a system includes a memory storing data and a processor in communication with the memory, the processor configured to cluster the data to a point in time to consolidate the data with a past decision value, and to output a result that minimizes a difference with the past decision value.

In another implementation, a method of managing an audio stream includes clustering data to a point in time, consolidating the data with a past decision value, and outputting a result that minimizes a difference with the past decision value.

According to another embodiment, a program product includes a computer readable storage medium having computer readable program code embodied therewith, the computer readable program code being executable by a processor to cluster the data to a point in time and consolidates the data with a past decision value, and to output a result that minimizes a difference with the past decision value.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

V. BRIEF DESCRIPTION OF THE DRAWINGS

FIG. 2 is a table displaying sorted diarization results generated by an embodiment of a system, such as the system of FIG. 1;

FIG. 3 is a table showing an illustrative output of a method of an embodiment executed by a system, such as the system of FIG. 1;

VI. DETAILED DESCRIPTION

According to a particular embodiment, a system clusters data up to a current point in time and consolidates it with the past decisions, and then returns the result that minimizes the difference with past decisions. The consolidation may be achieved by performing a permutation of the different possible labels and comparing the distance. For speaker diarization, a distance may be determined based on a minimum edit or hamming distance. The distance may alternatively be a measure other than the minimum edit or hamming distance. The clustering may have a finite time window over which the analysis is performed. That is, clustering may not necessarily need to go back to the beginning of time.

An embodiment of a diarization method segments speech into T potential turns (e.g., contiguous sequences of words). The output from the diarization may be a string of T speaker labels. In the special case of two speakers, the diarization output is a bit vector of T bits, where the ith bit indicates which of the two speakers uttered the ith turn. A record of all the pre-assigned segments may be kept. All possible mappings between the newly assigned speaker centroids and the diarization history may be accomplished. This mapping exhaustively examines all possible permutations of the centroid labels to find the optimal one.

All audio up to this point may be used for a better, more accurate diarization performance without losing the streaming nature of the system. The method may keep track of previous decisions (e.g., speaker turns) in order to provide smooth and consistent results.

Figure 1:
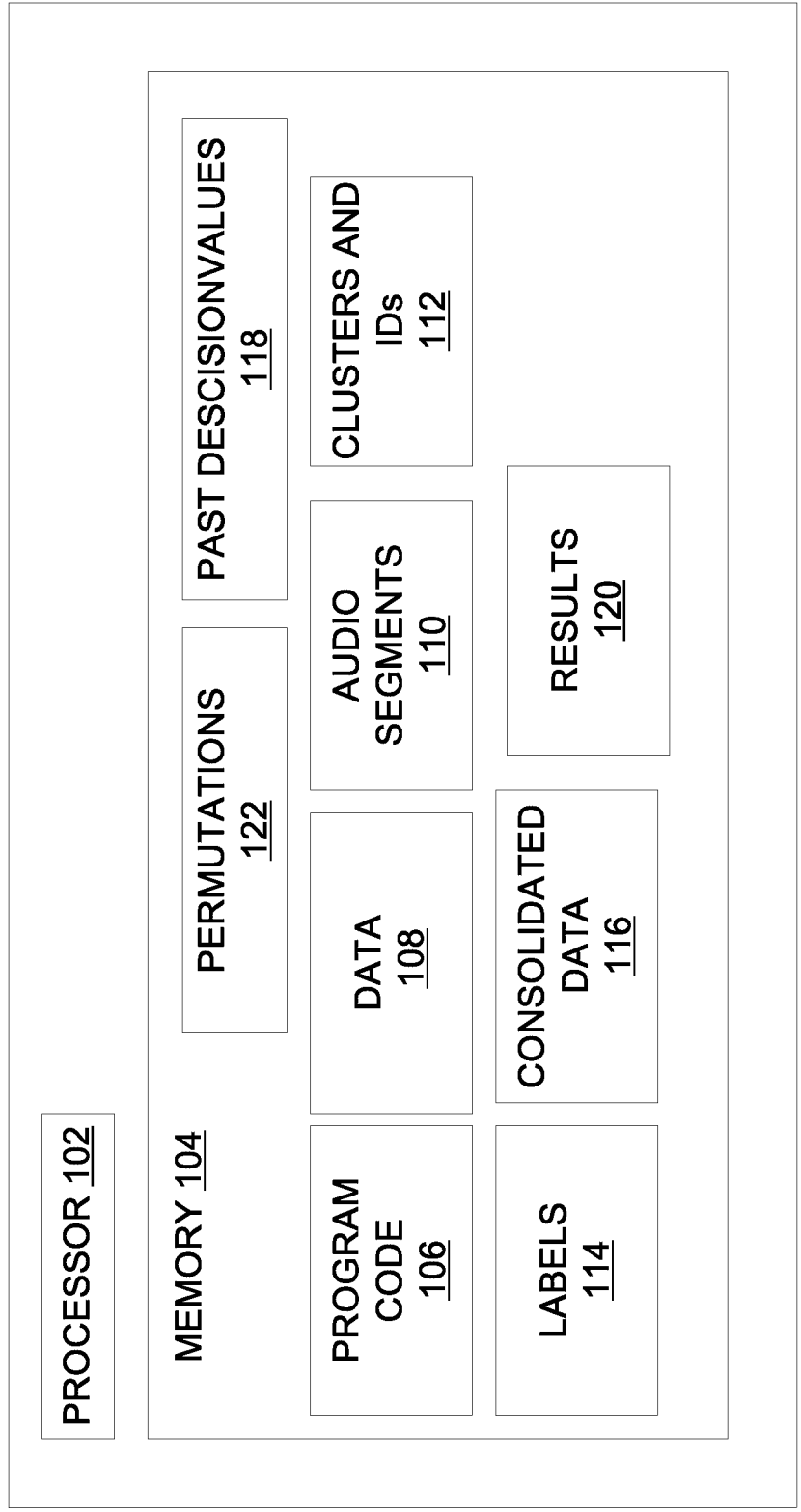
FIG. 1 illustrates an example computing environment, according to one embodiment.

FIG. 1 illustrates an example computing environment 100, according to one embodiment. As shown, the computing environment 100 includes a processor 102 and a memory 104. The memory 104 may include program code 106 that is executable by the processor 102. The memory 104 may also store data 108 and audio segments 110. Clusters and cluster identifiers (IDs) are shown at 112. The memory 104 may additionally store labels 114, consolidated data 116, and system results 120. To assist in this regard, the system 100 may store and use past decision values 118 and permutations 122.

An embodiment may include a prefix method, a compromise intended to capture much of the performance of the offline solution, but do so in a left-to-right fashion. FIG. 2 is a table showing the performance of a prefix method. This method is an improvement over the greedy method, but with less precision than the offline solution. The prefix method starts with diarization from an automatic speech recognition (ASR) system that segments the speech into T turns (e.g., contiguous sequences of words). The output from diarization may be a string of T speaker labels. In the special case of two speakers, the diarization output is a bit vector of T bits, where the ith bit indicates which of the two speakers uttered the itch turn. FIG. 2 is a table of diarization results that are reported for three methods, sorted from best to worst. The proposed prefix method is a compromise intended to capture much of the performance of the offline solution, but do so in a L2R (left-to-right) fashion. FA and Miss may be constant because the same SAD is used throughout.

FIG. 3 is a table showing an example of a method of an embodiment. There is a row for each turn. The prefixes show the assignment of speaker labels by the offline diarization algorithm to turns that have been seen so far. The system may include a diarization from ASR that segments speech into T turns. The output from diarization is a string of T speaker labels. In the special case of two speakers, the diarization output is a bit vector of T bits, where the ith bit indicates which of the two speakers uttered the ith turn.

After each turn, a method applies the offline clustering solution to the audio turns that have been seen so far, as illustrated in FIG. 3. That is, after each turn, the prefix is a bit vector with the best assignment of diarization labels that we could hope to come up with using our best method (Offline). When it becomes necessary to output speaker labels, the system may use the prefix to do so. Definitive labels may be required after every turn, every few turns, or before a set time has elapsed. In any case, there is a symmetry that needs to be dealt with when creating prefixes. There may be no special meaning of 1 and 2 in the offline output. The clustering method may arbitrarily assign the label 1 to one of the two centroids and the label 2 to the other. That is, all the bits in the offline solution can be flipped without changing the error rate. The prefix method needs to address this issue because we don't want the meaning of 1 and 2 to change on each turn. In the more general case with more than two speakers, instead of just two possibilities (flip all the bits or not), the system may consider permutations of speaker labels. For each permutation the system may calculate the hamming distance to the prefix for the previous turn. In this way, the system may avoid undesirable reassignments of speaker labels across turns.

An embodiment of the prefix method avoids greedy heuristics as much as possible. After each turn, the prefix method applies the offline clustering solution to the audio turns that have been seen so far, as illustrated in the table of FIG. 3. That is, after each turn, the prefix is a bit vector with good diarization labels. When output speaker labels are output, the embodiment may use the prefix to do so. Definitive labels may be required after every turn, every few turns, or before a set time has elapsed. In any case, there may be an important symmetry that needs to be dealt with when creating prefixes. There may be no special meaning of 1 and 2 in the offline output. The clustering method may arbitrarily assign the label 1 to one of the two centroids and the label 2 to the other. That is, all the bits in the offline solution may be flipped without changing the error rate. The prefix method addresses this issue because it may not be desirable for the meaning of 1 and 2 to change on each turn. In the more general case, with more than two speakers, instead of just two possibilities (e.g., flip all the bits or not), the system may consider permutations of speaker labels. For each permutation, an embodiment calculates the Hamming distance to the prefix for the previous turn. In this manner, an embodiment may avoid undesirable reassignments of speaker labels across turns.

The prefixes in the table of FIG. 3 are consistent with one another, as indicated by small Hamming distances. Even so, the first column is somewhat unstable, which has more is at the top and more 2s at the bottom. In this case, the instability may have been caused by a computer voice. The instability may cause assignments to be mostly nonsensical (not shown) for the greedy left-to-right online method. The beginning of the calls may not be representative of the end, and therefore, i-vector centroids based on the beginning of these calls may not generalize well to the rest of the call. FIG. 3 shows that most columns are stable, but a few are very likely to flip back and forth. There are many reasons for flip-flopping in addition to the computer voice mentioned previously. FIG. 2 looks at the number of turns processed so far (the length of the prefix), as well as the duration of the current segment. In general, stability improves with longer prefixes and longer turns.

In an example, the system may use prior decisions, but use them to guide and update labels. In moving from theory into practice we introduce two tasks in which speaker diarization and recognition can be leveraged. First, the system may integrate speaker diarization and recognition systems to find a common speaker (e.g., a call center agent) across multiple calls and consequently their role. Furthermore, once the role is determined the corresponding speech recognition output can be analyzed to determine the type of support call.

An embodiment of a system may recover from previous bad decisions in a fast and consistent way. The system may use previously seen history to learn and adapt to future, unseen events while keeping the results consistent with the past. The system may include a low-latency streaming processing with performance close to the optimal offline one. The system may not rely on a prior knowledge of speakers (or even the number of speakers). The system may introduce a limited history window ensuring low computational complexity. Past that window, previously seen segments create centroids used in the clustering process. The system may use bottom-up clustering in every iteration to ensure robust and accurate speaker clusters.

Figure 4:
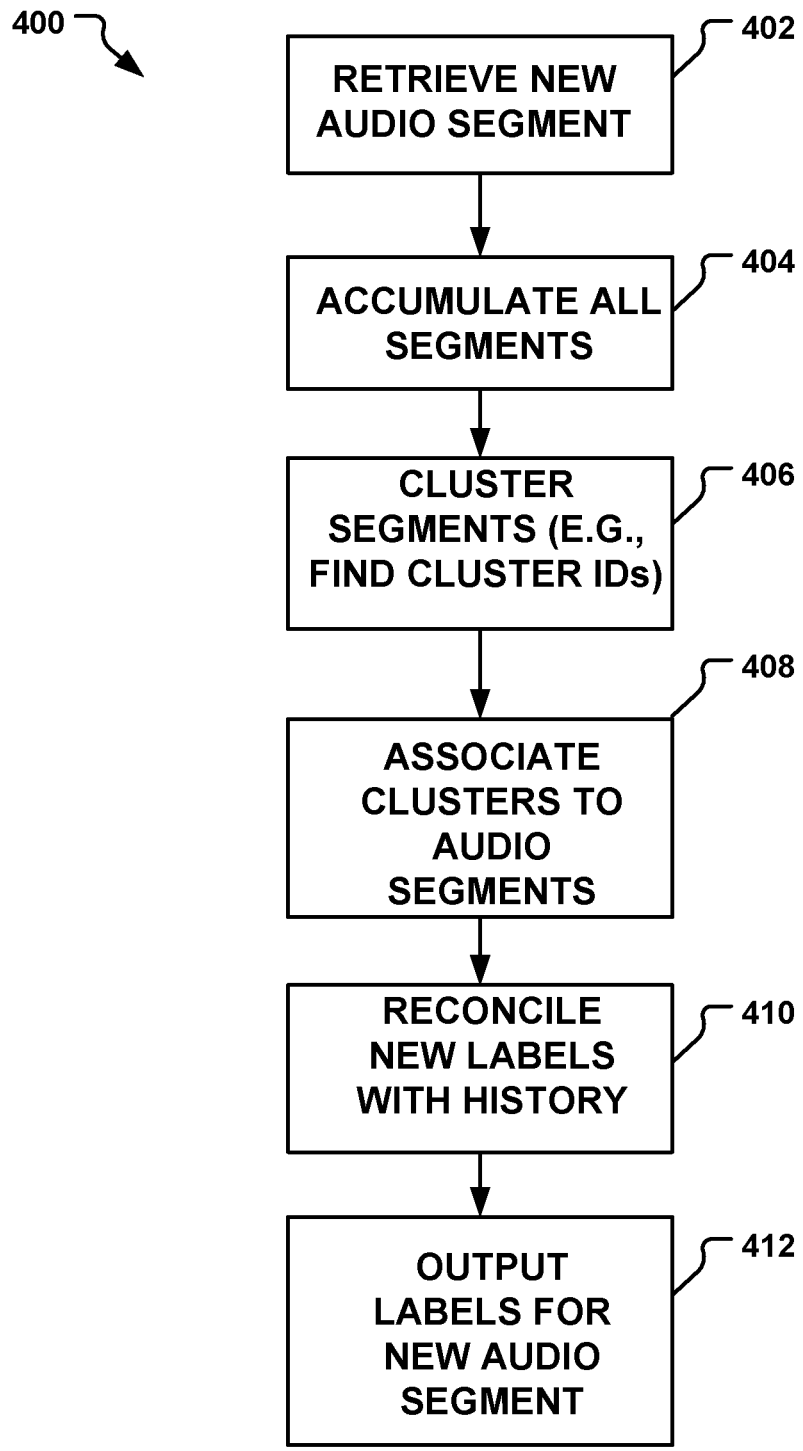
FIG. 4 is a flowchart of an illustrative non-limiting implementation of a method consistent with an embodiment.

FIG. 4 is a flowchart illustrating a method 400 consistent with an embodiment. At 402, a system may retrieve or otherwise receive a new audio segment. The audio segment may be accumulated and stored at 404 with previously received audio segments. An embodiment of the method clusters the segments at 406. The clustering process may include finding and assigning cluster identifiers (IDs).

Figure 5:
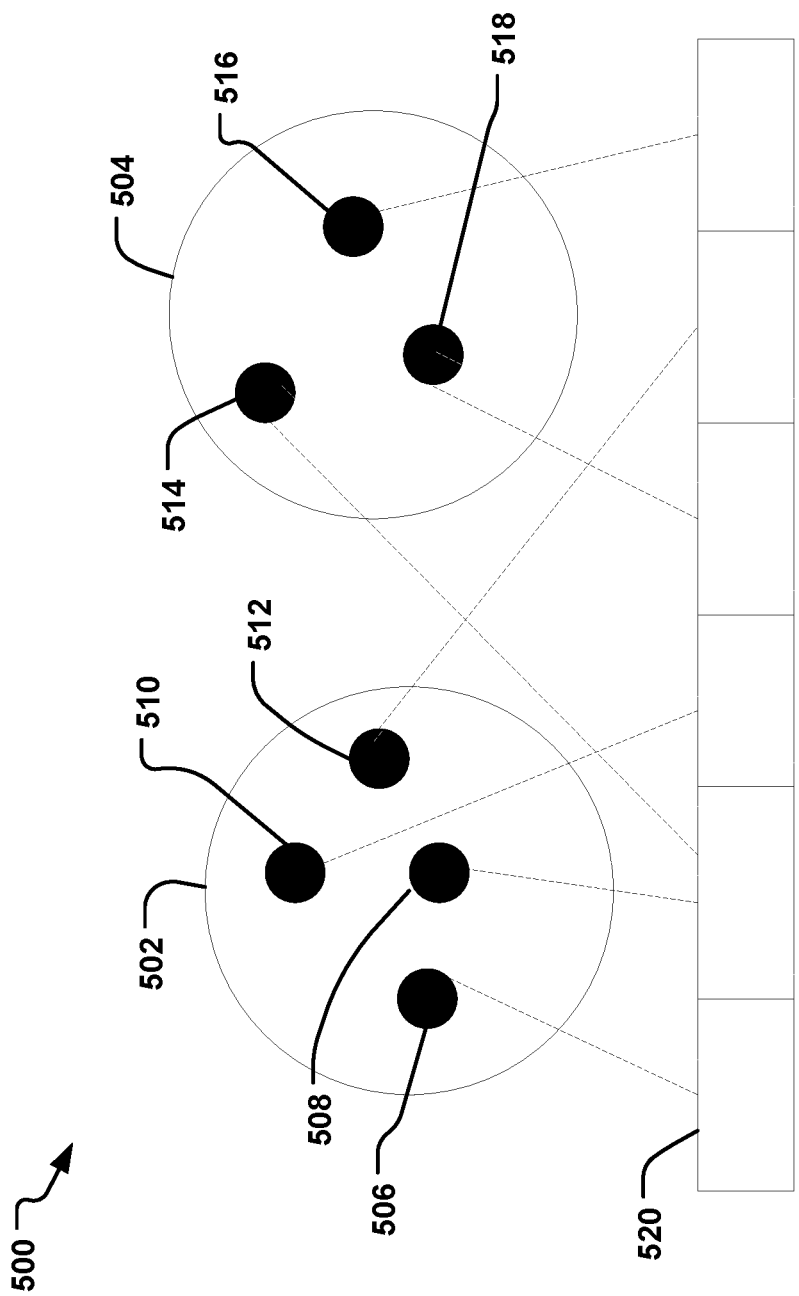
FIG. 5 is block diagram depicting the clustering of data and correlation of the clustered data to audio segments.

At 408 of FIG. 4, the clusters may be associated with stored audio segments. FIG. 5 is a block diagram depicting the cluster A 502 and Cluster B 504 having data 506, 508, 510, 512, 514, 516, 518 that is associated with audio segments 520.

At 410 of FIG. 4, the system may reconcile new labels with past values. For instance, the system may access an audio label history. Labels for the new audio segments may be output at 412 of FIG. 4.

Figure 6:
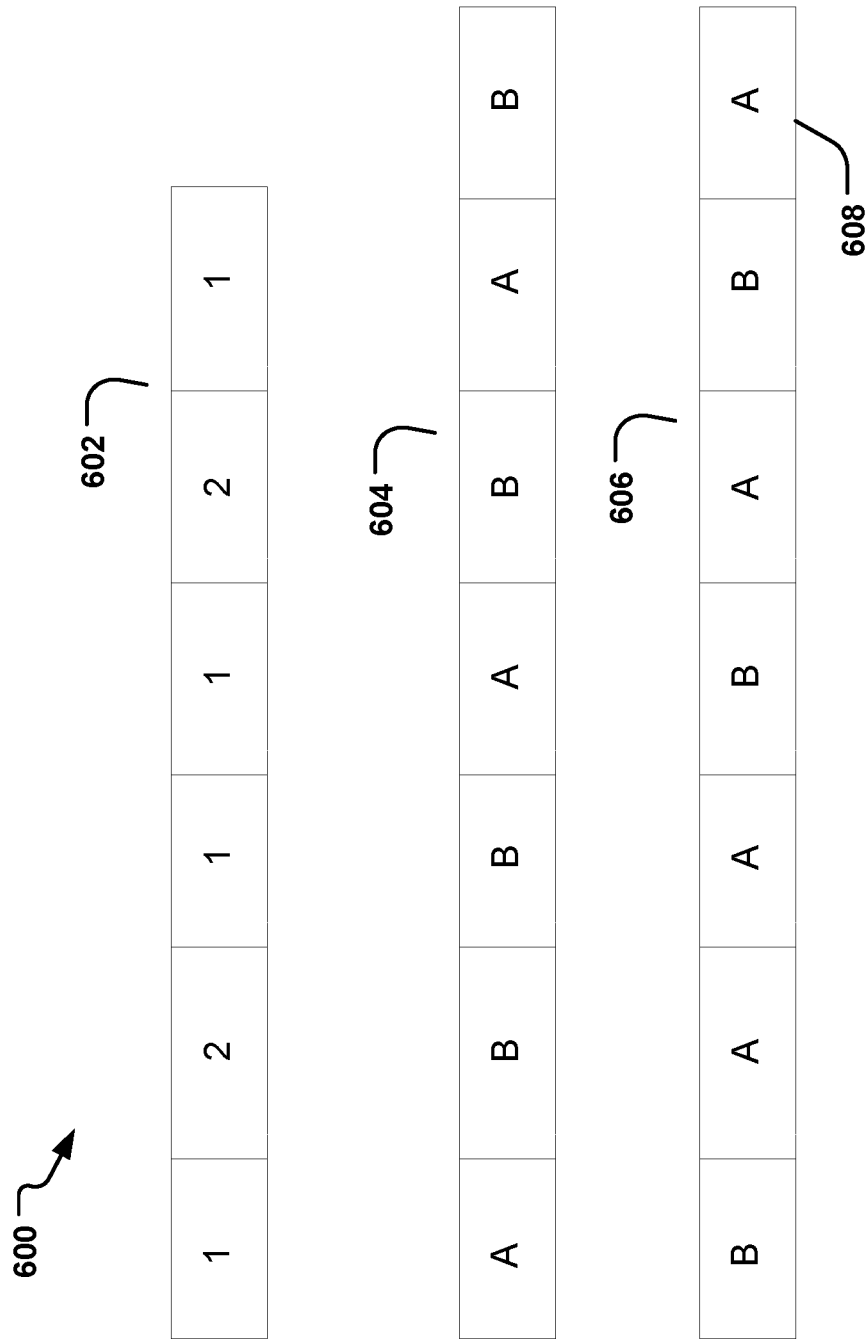
FIG. 6 shows permutations generated based on Hamming or other distances used by an embodiment.

FIG. 6 is a block diagram relating to 410 of FIG. 4 in that it illustrates permutations 600 generated based on Hamming or other distances. In the illustrative permutations 600, "A" is designated for a first speaker, and "B" is designated for a second speaker. A past permutation 602 may be compared with other permutations 604, 606 from which the system may choose. 608 may represent a new segment.

Figure 7:
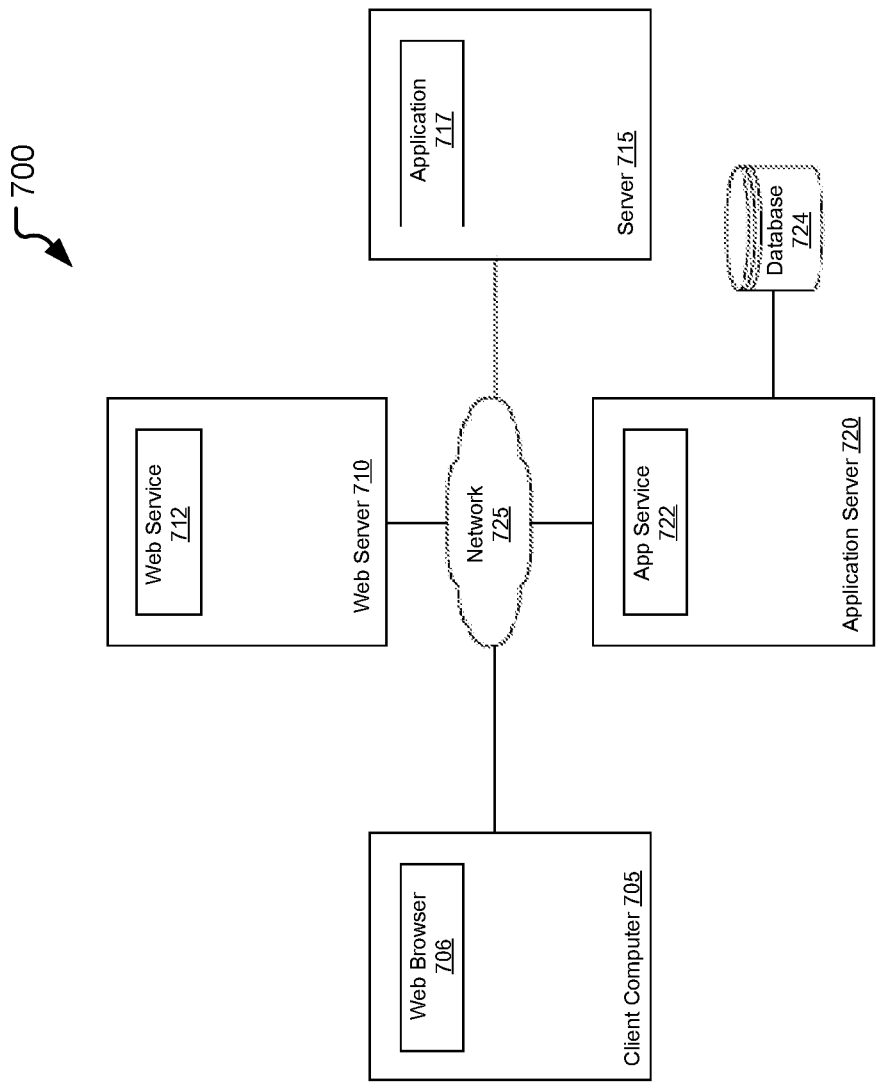
FIG. 7 is block diagram of a system that is consistent with an embodiment.

FIG. 7 illustrates another example computing system according to one embodiment, such as may be realized using a networked environment. As shown, the computing environment 700 includes a client computer 705, a web server 710, a server 715, and an application server 720. The client computer 105 may be a physical system (e.g., a desktop, laptop computer, mobile device, etc.) or a virtual computing instance executing in the cloud. The client computer 705 includes a web browser 707. A user may access data services through the web browser 707 over a network 725 (e.g., the Internet).

For instance, a user may access a web service 712 executing on a web server 710. In one embodiment, the web service 712 provides a web interface for an application server 720 (e.g., executing an application service 722). More specifically, the application service 722 provides a database 724. The database 724 includes data presented to users on the web browser 707.

Figure 8:
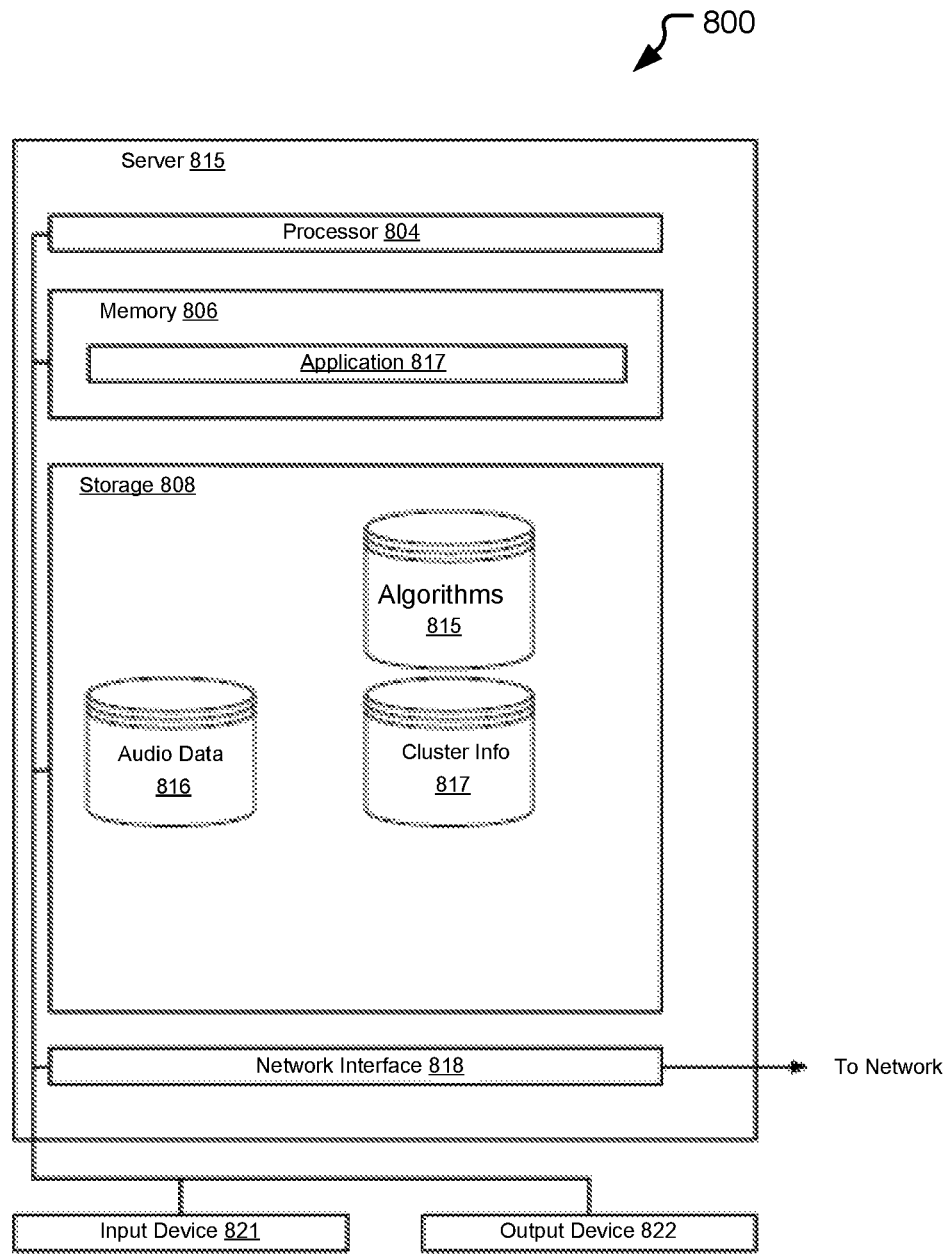
FIG. 8 is block diagram of a networked system that is consistent with an embodiment.

FIG. 8 further illustrates a server 815, such as the server 715 of FIG. 7, according to one embodiment. The server 815 generally includes a processor 804 connected via a bus to a memory 806, a network interface device 818, a storage 808, an input device 821, and an output device 824. The server 815 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 804 is included to be representative of a single CPU, multiple CPUs, a single CPU having multiple processing cores, and the like. Similarly, the memory 806 may be a random access memory. While the memory 806 is shown as a single identity, it should be understood that the memory 806 may comprise a plurality of modules, and that the memory 806 may exist at multiple levels, from high speed registers and caches to lower speed but larger DRAM chips. The network interface device 818 may be any type of network communications device allowing the navigation server 810 to communicate with other computers via the network 825.

The storage 808 may be a persistent storage device. Although the storage 808 is shown as a single unit, the storage 808 may be a combination of fixed and/or removable storage devices, such as fixed disc drives, solid state drives, removable memory cards, optical storage and network storage systems.

As shown, the memory 806 contains the application 817, which may be an application generally executed to take actions described herein. Storage 808 contains the algorithms 815, audio data 816, and cluster information 817.

The input device 821 may provide a keyboard and/or a mouse, etc. The output device 824 may be any conventional display screen. Although shown separately from the input device 821, the output device 824 and input device 821 may be combined. For example, a display screen with an integrated touch-screen may be used.

The system may introduce variations with alternatives for various words and concepts. Concept lists may be populated by the system to increase accuracy. The system may allow for the automatic expansion of the semantic space during graph creation. Elements may be automatically matched based on their semantic meaning during the graph query. The system may further adapt a word representation to the domain if needed by retraining the word representations. The system may use vocabulary automatically harvested from domain specific documents for clustering. The system may use the labels of these clusters as a way to automatically discover entity types for variation generation in the dialog system. The system may accomplish automatic creation and query matching, including the expansion and matching of triplets.

The system may automatically select cluster radii to focus results. An embodiment of the system may add a kernel that dissipates polynomially (e.g., one that is scaled with a small coefficient). The kernel may resolve instabilities in convergence of the algorithm. Regarding scaling of the kernel, the system may automatically increase or decrease the scaling factor based on how close to the highest possible mutual information that data is when the algorithm converges.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

The invention claimed is:

1. An apparatus comprising:
a memory storing a plurality of past audio segments and past diarization labels associated with the plurality of past audio segments; and
a processor in communication with the memory, the processor configured to:
receive an audio segment at a current point in time;
accumulate the audio segment with the plurality of past audio segments to obtain accumulated audio segments data;
cluster the accumulated audio segments data up to the current point in time, wherein the clustering includes:
based on centroid labels of clusters associated with the accumulated audio segments, locating and assigning a plurality of different possible diarization labels associated with a plurality of speakers; and
consolidating the accumulated audio segments data with the past diarization labels, wherein the consolidation includes performing a plurality of permutations of the centroid labels of clusters and finding an optimal diarization result that minimizes a difference between the past diarization labels and the permuted centroid labels up to the current point in time; and
output the optimal diarization result comprising the permuted centroid labels associated with the plurality of speakers.

2. The apparatus of claim 1, wherein the consolidation includes comparing a distance.

3. The apparatus of claim 2, wherein the distance is determined based on a Hamming distance.

4. The apparatus of claim 2, wherein the distance is determined based on a measure of a minimum edit.

5. The apparatus of claim 2, wherein the processor is further configured to select a permutation based on the distance.

6. The apparatus of claim 1, wherein the accumulated audio segments is clustered during a finite period of time.

7. The apparatus of claim 1, wherein the processor is further configured to store a plurality of audio segments up to the current point in time.

8. The apparatus of claim 1, wherein clustering the accumulated audio segments data includes finding a cluster identifier (ID).

9. The apparatus of claim 1, wherein the processor is further configured to associate a cluster with an audio segment.

10. The apparatus of claim 1, wherein the processor further configured to output a label for a next occurring audio segment.

11. A method of managing an audio stream, the method comprising:
obtaining a plurality of past audio segments and past diarization labels associated with the plurality of past audio segments;
receiving an audio segment at a current point in time;
accumulating the audio segment with the plurality of past audio segments to obtain accumulated audio segments;
clustering the accumulated audio segments data up to the current point in time, wherein the clustering includes:
based on centroid labels of clusters associated with the accumulated audio segments data, locating and assigning a plurality of different possible labels associated with a plurality of speakers; and
consolidating the accumulated audio segments data with the past diarization labels, wherein the consolidation includes performing a plurality of permutations of the centroid labels of clusters and finding an optimal diarization result that minimizes a difference between the past diarization labels and the permuted centroid labels up to the current point in time; and
outputting the optimal diarization result comprising the permuted centroid labels associated with the plurality of speakers.

12. The method of claim 11, further comprising comparing a distance to determine the consolidation.

13. The method of claim 12, further comprising comparing the distance using a Hamming distance.

14. The method of claim 13, further comprising selecting a permutation based on the distance.

15. The method of claim 11, wherein the accumulated audio segments is clustered during a finite period of time.

16. A program product comprising a computer readable storage medium having computer readable program code embodied therewith, the computer readable program code being executable by a processor to:
obtain a plurality of past audio segments and past diarization labels associated with the plurality of past audio segments;
receive an audio segment at a current point in time;
accumulate the audio segment with the plurality of past audio segments to obtain accumulated audio segments data;
cluster the accumulated audio segments data up to the current point in time, wherein the clustering includes:
based on centroid labels of clusters associated with the accumulated audio segments data, locating and assigning a plurality of different possible labels associated with a plurality of speakers; and
consolidating the accumulated audio segments data with the past diarization labels, wherein the consolidation includes performing a plurality of permutations of the centroid labels of clusters and finding an optimal diarization result that minimizes a difference between the past diarization labels and the permuted centroid labels up to the current point in time; and
output the optimal diarization result comprising the permuted centroid labels associated with the plurality of speakers.

* * * * *